Patented Mar. 26, 1946

2,397,412

UNITED STATES PATENT OFFICE 2,397,412

PROCESS FOR PRODUCING ARALKYL ALDEHYDES

William S. Emerson, Dayton, Ohio, assignor to Monsanto Chemical Company, a corporation of Delaware No Drawing. Application February 20, 1943,
Serial No. 476,623

6 Claims. (Cl. 260—599)

This invention relates to the manufacture of aryl-substituted acetaldehydes and more particularly to a process for the manufacture of phenylacetaldehyde or its nuclear and alpha-alkyl derivatives.

An object of this invention is to provide an improved process of producing aryl-substituted acetaldehydes by the vapor phase dehydrohalogenation and rearrangement of the halohydrins of vinyl aromatic compounds, substantially according to the equation:

$$RCXOHCH_2Y \rightarrow RCH_2CHO \text{ or } RCXCHO + HY$$

wherein R is a substituted or unsubstituted aromatic hydrocarbon radical, X is hydrogen or an alkyl group such as a methyl, ethyl, propyl, etc. group and Y is a halogen atom, preferably chlorine and bromine. As examples of aryl-substituted acetaldehydes which may be prepared in this manner may be mentioned phenylacetaldehyde, nuclear derivatives of phenylacetaldehyde such as ortho-, meta- or para-tolylacetaldehyde, the xylylacetaldehydes, the chlorophenylacetaldehydes, the bromophenylacetaldehydes, the fluorophenylacetaldehydes, the alpha-alkyl phenylacetaldehydes, such as alpha-methyl phenyl-acetaldehyde, alpha-ethyl phenylacetaldehyde, alpha-propyl phenylacetaldehyde, etc.

In the prior art, phenylacetaldehyde or its nuclear derivatives have been prepared by a variety of methods, but these have not been applicable to the production of such compounds on a commercial scale. For example, according to Whitmore (Organic Chemistry, 1937, p. 794), phenylacetaldehyde is best prepared from cinnamic acid by first adding hypochlorous acid and then rearranging and decarboxylating the product. This method, however, is of little practical importance in that cinnamic acid, itself, is not readily available. Phenylacetaldehyde is also obtainable in low yields by heating styrene glycol with dilute sulfuric acid (Ann. 216, 301) as well as by the action of silver nitrate on styrene iodohydrin or the action of dilute sulfuric acid on styryl alkyl or aryl ethers (Ber. 14, 1868, Ber. 38, 1936, Ann. 308, 270). The low yields obtainable by these methods as well as the comparative unavailability of some of the reagents employed make them unsuitable for commercial use.

I have found that aryl-substituted acetaldehydes and the alpha-alkyl derivatives thereof are obtainable in good yields by passing vapors of a halohydrin of a vinyl aromatic compound or a halohydrin of an alpha-alkyl vinyl aromatic compound and steam over a substantially neutral catalyst at a temperature substantially within the range of about 250° C. to about 600° C. It has also been found that while temperatures within this range yield good results, far better yields are obtained when the operating temperature falls within the preferred range of about 300° C. to about 500° C. For example, phenyl acetaldehyde is obtainable in yields of the order of 75% to 90% by passing vapors of styrene chlorohydrin with steam over substantially neutral surface catalyst at temperatures of from 300° C.–500° C.

I pack a quartz tube having an internal diameter of about 1 inch and length of about 18 inches with a substantially neutral catalyst, for example, silica or calcium carbonate on silica. I apply external heat, raising the temperature of the interior of the tube to approximately 300° C. to 500° C., depending upon the nature of the catalyst employed. Into the catalyst tube I then introduce through one conductor the volatilized styrene chlorohydrin and through another conductor an excess of superheated steam. Instead of the volatilized chlorohydrin, I may employ the liquid chlorohydrin; in this case, however, I apply heat to the conducting tube in such a manner as to volatilize the reactant before it enters the catalyst tube. When operating on a small scale, the liquid chlorohydrin may also be dropped very slowly at the top of the catalyst chamber, volatilization of the liquid occurring before it comes into contact with the catalyst. The rate at which the steam and the chlorohydrin are passed through the catalyst tube depends upon the heat capacity of the plant. In laboratory experiments, employing the catalyst tube described above, I find that very good results are obtainable by passage of the styrene chlorohydrin at the rate of about 1 g. per 30 to 120 seconds. In selecting both the optimum temperature and the optimum rate of addition of the reactants, care must be observed to maintain both rate and temperature high enough to avoid condensation and low enough to avoid the formation of tarry products in the catalyst chamber.

As far as I am able to ascertain, the vapor phase conversion of styrene halohydrins or the halohydrins of other vinyl aromatic compounds into phenylacetaldehyde or the nuclear derivatives thereof by passage of the halohydrins in the vapor state over substantially neutral surface catalysts at elevated temperatures has not been hitherto disclosed. While I am aware of the vapor phase dehydrohalogenation of aliphatic halohydrins into the corresponding aldehydes or ketones, for example as described in U. S. Patent 2,208,557 to James L. Amos and George W. Hooker, this purely aliphatic reaction could not have anticipated the behavior of styrene halohydrins or the halohydrins of other vinyl aromatic compounds when submitted to dehydrohalogenating conditions in the vapor phase. Styrene halohydrins, being unsymmetrical molecules, could undergo dehydrohalogenation and rearrangement to either acetophenone or phenylacetaldehyde. However, in the presence of a substantially neutral catalyst the aldehyde is produced to the substantial exclusion of the ketone.

The invention is further illustrated, but not limited, by the following examples:

*Example 1*

25 g. of styrene chlorohydrin was passed through a quartz tube, packed with silica, for 35 minutes at a temperature of 520–550° C. and a pressure of 135–155 mm. of mercury. Simultaneously an excess of steam was introduced into the reaction tube. At the end of the run, steam was led through the catalyst tube for approximately five minutes in order to drive out any retained reaction products or reactants. The contents of the receiving flask were extracted 3 times with benzene. The benzene extract was combined with washings obtained by treatment of the interior of the catalyst tube with three 25 cc. portions of benzene, and the whole was distilled under partial vacuum, 13 g. (68% theoretical yield) of phenylacetaldehyde, B. P. 84–89° C./16 mm., $n_D^{25}$ 1.5340, being obtained. This product is slightly contaminated with beta-chlorostyrene which raises the refractive index.

*Example 2*

I operate as in Example 1, except that instead of silica I use a catalyst comprising calcium carbonate on silica gel, prepared by washing the silica gel with aqueous calcium chloride, then treating it with aqueous ammonium carbonate and ammonium hydroxide, and finally evaporating to dryness and baking out the ammonium chloride. Also, instead of employing the operating conditions described in Example 1, in this case the run is conducted at a temperature of 360–380° C., a pressure of 85–105 mm., and a time of 1 hour and 50 minutes. Operating in this manner there was obtained 8 g. of substantially pure phenylacetaldehyde, B. P. 90–98° C./18 mm.

In the above examples reaction was effected under reduced pressure. Although I find that better conversion to phenylacetaldehyde is obtained by reaction under diminished pressure, good yields are also obtainable when employing atmospheric or even superatmospheric pressures, the amount of pressure employed varying with the type of reaction equipment used.

Instead of silica or calcium carbonate on silica gel, I can employ other neutral, inert surface catalysts for the vapor phase conversion of chlorohydrins of vinyl aromatic compounds into the corresponding aryl-substituted aldehydes. I may use, for example, fuller's earth, kieselguhr, diatomaceous earth, kaolin or other argillaceous or siliceous substantially inert materials.

While the above examples are limited to the preparation of phenylacetaldehyde, the present process is also applicable to the preparation of nuclearly substituted phenylacetaldehydes, for example, the tolylacetaldehydes, the xylylacetaldehydes, the halogen substituted phenylacetaldehydes such as the chlorophenylacetaldehydes, alpha-alkyl phenylacetaldehydes, etc., since the presence of the nuclear and the alpha-alkyl substituents in the initially employed vinyl aromatic chlorohydrins has substantially no effect on the progress of the reaction.

What I claim is:

1. A process for preparing phenylacetaldehyde which comprises passing styrene halohydrin and steam through a reaction chamber at a temperature substantially within the range of about 250° C. to about 600° C.

2. A process for preparing phenylacetaldehyde which comprises passing styrene chlorohydrin and steam through a reaction chamber containing a substantially neutral catalyst at a temperature substantially within the range of about 300° C. to about 500° C.

3. A process according to claim 2 which is carried out at a pressure below atmospheric pressure.

4. A process according to claim 2 in which the reaction chamber is a quartz tube packed with a substantially neutral siliceous catalyst.

5. A process according to claim 2 in which the rate of addition of the reactants and the temperature are regulated so as to avoid condensation and the formation of tarry products in the catalytic chamber.

6. A process according to claim 2 which is carried out at a temperature substantially within the range of about 360° C. to about 380° C. and at a pressure of 85 to 105 mm.

WILLIAM S. EMERSON.